UNITED STATES PATENT OFFICE 2,632,756

OLEFINIC TETRAESTERS OF BIS(PHOSPHO-NOALKYL) ETHERS AND THEIR POLYMERS

Denham Harman and Alan R. Stiles, Berkeley, Calif., assignors to Shell Development Company, San Francisco, Calif., a corporation of Delaware No Drawing. Application October 15, 1949,
Serial No. 121,638

9 Claims. (Cl. 260—78.5)

This invention relates to a new class of polymerizable diphosphonic acid esters of the formula

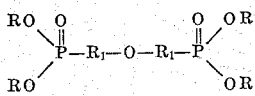

where R represents a 2-alkenyl radical or a halo-substituted 2-alkenyl radical, and $R_1$ represents an alkylene radical or a halosubstituted alkylene radical, and their polymers.

Numerous polymerizable 2-alkenyl esters and their polymers are known. It is known that those of the mono- and polycarboxylic acids are relatively hard to polymerize (they require long reaction periods in the presence of a free radical forming polymerization catalyst at a temperature at which the catalyst rapidly forms free radicals) and that the polymers are relatively flammable compositions. Those of hydrocarbon phosphonic acids (for example, diallyl phenyl phosphonate) have improved flammability properties but require similar rigorous conditions of polymerization.

We have discovered that the olefinic tetraesters provided by the invention form polymers exhibiting markedly improved flammability characteristics as compared to olefinic esters of carboxylic acids, and that in contrast to the general rule, they are highly active in polymerization reactions.

Examples of the compounds provided by the invention include bis(diallylphosphonomethyl) ether, bis[2-(dimethallylphosphono)ethyl]ether, bis(dicrotylphosphonomethyl) ether, bis[1-methyl-2-(diallylphosphono)ethyl] ether, bis(di-2-chloroallylphosphonomethyl) ether, the reaction product of triallyl phosphite and a chlorinated diethyl ether containing from 3 to 10 chlorine atoms, and bis(di-2-pentenylphosphonomethyl) ether.

A preferred class of compounds provided by the invention are bis(di-2-alkenylphosphonomethyl) ethers.

The esters provided by the invention can be conveniently prepared by the isomerization of a trialkenyl phosphite or an alkali metal dialkenyl phosphite with the corresponding polyhalo ethers under the reaction conditions usually employed for the "Arbusov" reaction. The esters of the preferred class are produced in a substantially quantitative yield by heating a tri-2-alkenyl phosphite with symmetrical-dichloro dimethyl ether.

As the esters provided by the invention polymerize readily, it may prove desirable to have present in the reaction mixture, particularly during the purification of the product, an inhibitor such as tannic acid, naphthol, phenol, quinol, or a copper salt.

The esters are polymerized by use of heat alone or more preferably by heating in the presence of a polymerization catalyst. Various oxygen-yielding polymerization catalysts are suitable for this purpose, for example, benzoyl peroxide, acetyl peroxide, benzoyl acetyl peroxide, lauroyl peroxide, dibutyryl peroxide, succinyl peroxide, sodium peroxide, barium peroxide, tertiary-butyl peroxide, peracetic acid, perphthalic acid, alkali metal perborates or persulfates, ozone, air and oxygen. The esters can also be polymerized in the presence of their own peroxides or ozonides.

If desired, a mixture of polymerization catalysts can be used, a suitable mixture being that of benzoyl peroxide and di-tertiary-butyl peroxide.

The amount of catalyst to be used is preferably between about 0.01% and 5%, although the amount can be varied considerably. Good results are obtained with about 0.5% to 2.0% of polymerization catalyst.

In still other cases, it may be desired to use no other agent to effect polymerization than heat. Although both heat and light may be used together, in some cases light alone, is sufficient. Temperatures between about 60 and 150° C. are preferred for use, both with and without polymerization catalysts, although higher or lower temperatures can also be used in some cases.

The esters can be mixed with other polymerizable compounds and the mixture subjected to polymerizing conditions whereby copolymers are produced. The copolymers are particularly valuable in that the fire-resistant qualities of the esters are imparted to the resulting resin. Copolymers with other modified properties are obtained with varying amounts and/or kind of copolymerizable compound mixed with the esters. Any compound capable of addition polymerization is suitable for preparation of the copolymers such as crotyl stearate, cyclopentadiene, and compounds containing the $CH_2=C<$ or vinylidene group like styrene, methyl styrene, butadiene-1,3, isoprene, vinyl acetate, diallyl phthalate, methyl acrylate, diallyl diglycollate, allyl acetate, ethyl acrylate, methyl vinyl ketone, methyl isopropenyl ketone, acrolein, methacrolein, acrylonitrile, etc. The proportion of copolymerizable compound in admixture with the unsaturated ester can vary over wide limits as from 1% to 99%. Excellent copolymers are obtained with about 10% of the phosphonate ester and 90% of the other polymerizable compound. If desired, two or more different copolymerizable compounds can be copolymerized with the ester. In some cases it is desirable to copolymerize two or more different unsaturated arylphosphonates.

If desired, the esters of the invention may be polymerized in the presence of added agents such as dyes, pigments, fillers, etc., to obtain polymerized products comprising such coloring matter or fillers and having properties modified by the presence of such added substances. Also such addition agents may be incorporated with the esters in a partially polymerized state before further polymerization, for example, in molding to produce decorative effects or to modify certain physical properties of the molded product.

The following examples are presented to illustrate in detail procedures by which the compounds provided by the present invention can suitably be prepared. As the compounds provided by the invention can have a variety of different structures, and, in some cases, can be prepared by other procedures, the invention is not to be construed as limited to the particular materials or conditions specified in the examples.

*Example I*

Bis(diallylphosphonomethyl) ether is produced by heating for 20 hours at 125° C. a solution composed of 500 grams of triallyl phosphite and 100 grams of sym-dichlorodimethyl ether. The tetraester is isolated by fractionally distilling the reaction mixture.

*Example II*

Bis(dimethallylphosphonomethyl) ether is produced by heating for 24 hours at 130° C. a solution composed of 400 grams of trimethallyl phosphite and 80 grams of sym-dichlorodimethyl ether. The tetraester is isolated by fractionally distilling the mixture.

*Example III*

Bis(dichloroallylphosphonomethyl) ether is prepared by heating for about 20 hours at 125° C. a solution composed of 500 grams of trichloroallyl phosphite and 100 grams of sym-dichlorodimethyl ether. The tetraester is isolated by fractionally distilling the mixture.

*Example IV*

Poly[bis(diallylphosphonomethyl) ether] is produced by heating for 20 hours at 110° C. a solution composed of 100 grams of bis(diallylphosphonomethyl) ether and 1 gram of di-tertiary-butyl peroxide.

*Example V*

A copolymer containing bis(dimethallylphosphonomethyl) ether is prepared by heating a solution consisting of 50 grams of bis(dimethallylphosphonomethyl) ether, 50 grams of diallyl phthalate and 1 gram of benzoyl peroxide to a temperature of 65° C. for 24 hours, 90° C. for 6 hours and 115° C. for 18 hours. The copolymer is isolated by extracting off the unreacted monomers and peroxide.

Tetraesters provided by the invention range from colorless oily liquids to solids, have a very low vapor pressure, and have a density greater than one. That they have the indicated structure was established by analyzing a sample of bis(diallylphosphonomethyl) ether prepared as described in Example I. The tetraester was a colorless oily liquid B. P.>107/1 mm. $n_D^{20}$ 1.4761. It was found to contain 16.7% phosphorus and to have a molecular weight of 366; values corresponding, within the limits of experimental error, to the respective values calculated for a compound of the formula,

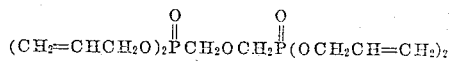

The homopolymers prepared from the tetraesters provided by the invention are clear, infusible, solid resins. That the polymerization of the tetraesters proceeds at a most surprising rate for allylically unsaturated compounds was demonstrated by the fact that when 6 grams of bis(diallylphosphonomethyl) ether was heated with 0.15 gram of di-tertiary-butyl peroxide at 115° C., the polymerization reaction was so rapid that it resulted in a mild explosion. The rate at which di-tertiary-butyl peroxide dissociates into free radicals increases very rapidly as the temperature is increased, see Ind. Eng. Chem. 41, p. 1673 (1949). At 115° C. the rate at which free radicals are formed is in the order of twice that of the rate at which they are formed at 110° C. In general, allylically unsaturated esters require from 10 to 20 hours of heating at temperatures of from 115 to 150° C., i. e., long heating in the presence of well above twice the effective concentration of the reaction initiating free radicals.

We claim as our invention:

1. Bis(diallylphosphonomethyl) ether.
2. Poly[bis(diallylphosphonomethyl) ether].
3. A copolymer of bis(diallylphosphonomethyl) ether with diallyl phthalate.
4. A bis(di-2-alkenylphosphonomethyl) ether.
5. A polymer of a bis(di-2-alkenylphosphonomethyl) ether.
6. A tetraester of the formula

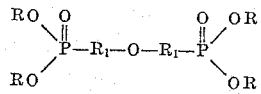

where R represents a radical of the group consisting of 2-alkenyl radicals and chlorosubstituted 2-alkenyl radicals, and $R_1$ represents the radicals selected from the group consisting of alkylene radicals and chlorosubstituted alkylene radicals.

7. A bis(di-2-alkenylphosphonoalkyl) ether.
8. A homopolymer of a bis(di-2-alkenylphosphonoalkyl) ether.
9. A copolymer of a bis(di-2-alkenylphosphonoalkyl) ether and a polymerizable compound containing the vinylidene group.

DENHAM HARMAN.
ALAN R. STILES.

REFERENCES CITED

The following references are of record in the file of this patent:

UNITED STATES PATENTS

| Number | Name | Date |
|---|---|---|
| 2,397,422 | Kosolapoff | Mar. 26, 1946 |
| 2,436,141 | Goebel | Feb. 17, 1948 |

OTHER REFERENCES

Abramov et al., J. Gen. Chem. (U. S. S. R.), vol. 12, pp. 270–275 (1942); Abstracts in Chem. Abstracts, vol. 37, columns 3048–3049 (1943).